(12) United States Patent
Wu

(10) Patent No.: US 7,029,125 B2
(45) Date of Patent: Apr. 18, 2006

(54) PROJECTING DEVICE WITH A KEYSTONE CORRECTION FUNCTION

(75) Inventor: Tsung-Hsun Wu, Taoyuan (TW)

(73) Assignee: Benq Corporation, Taoyuan Shien (TW)

( * ) Notice: Subject to any disclaimer, the term of this patent is extended or adjusted under 35 U.S.C. 154(b) by 35 days.

(21) Appl. No.: 10/881,922

(22) Filed: Jun. 30, 2004

(65) Prior Publication Data

US 2005/0001993 A1    Jan. 6, 2005

(30) Foreign Application Priority Data

Jul. 4, 2003   (TW) ................. 92118431 A

(51) Int. Cl.
*G03B 21/14*   (2006.01)

(52) U.S. Cl. ........................................ 353/69
(58) Field of Classification Search ............... 353/69, 353/70
See application file for complete search history.

(56) References Cited

U.S. PATENT DOCUMENTS

| | | | | |
|---|---|---|---|---|
| 5,641,957 A | * | 6/1997 | Chae | 250/231.14 |
| 5,717,935 A | * | 2/1998 | Zanders et al. | 713/300 |
| 5,720,539 A | * | 2/1998 | Woo | 353/69 |
| 6,481,855 B1 | * | 11/2002 | Oehler | 353/70 |
| 6,877,864 B1 | * | 4/2005 | Tamura et al. | 353/70 |
| 2004/0041985 A1 | * | 3/2004 | Kimura et al. | 353/70 |

* cited by examiner

*Primary Examiner*—William C. Dowling
(74) *Attorney, Agent, or Firm*—Thomas, Kayden, Horstemeyer & Risley

(57) ABSTRACT

A projecting device with a keystone correction function includes an adjustable part, a signal generator, a correction circuit and a micro-processing control unit. The adjustable part is coupled to a supporting foot of the projecting device, and an electric property thereof changes along with a different height of the supporting foot. When an angle of the projecting device is adjusted, the signal generator generates and outputs a corresponding adjusting signal serving as a basis for the keystone correction according to the electric property of the adjustable part. In practice, the adjustable part may be achieved by utilizing a rheostat, and the signal generator may be achieved by utilizing a biasing circuit and a converter. When an angle is adjusted, a resistance of the rheostat is also adjusted simultaneously so that the biasing circuit outputs different voltages to generate the adjusting signal.

14 Claims, 2 Drawing Sheets

PROJECTING DEVICE WITH A KEYSTONE CORRECTION FUNCTION

This application claims the benefit of Taiwan application Serial No. 92118431, filed Jul. 4, 2003, the subject matter of which is incorporated herein by reference.

BACKGROUND OF THE INVENTION

1. Field of the Invention

The invention relates to a projecting device, and more particularly to a projecting device with a keystone correction function.

2. Description of the Related Art

With the highly developed technology in the industry, the quality of the presentation apparatus in the meeting room is greatly improved, wherein the projector plays an important role in the meeting because its signal quality directly influences the visual feelings of all the attendant members.

In order to enable the projector to project the frame on a proper height, the angle of the projector has to be adjusted to meet the actual requirement of the meeting room. In order to satisfy various requirements of different meeting rooms, the angle of the projector has to be frequently adjusted. However, when the angle is adjusted, the frame may have keystone distortion. Thus, the keystone correction has to be performed to recover the keystone frame to a fairly upright frame and to reduce the distortion.

The conventional keystone correction is implemented using a horizontal integrated circuit (hereinafter referred to as IC). The horizontal IC may detect the angle offset of the projector in the horizontal axis (x-axis) or vertical axis (y-axis). Then, the system performs computations to automatically execute the keystone correction procedure according to the offset measured by the horizontal IC. Although the conventional method may solve the problem of keystone distortion, the price of the horizontal IC is relatively high and is a great loading to enterprises or customers when the price is added to the manufacturing cost. Consequently, it is important to develop a technology device to replace the horizontal IC, reduce the cost, and increase the product competitiveness.

SUMMARY OF THE INVENTION

It is therefore an object of the invention to provide a projecting device with a keystone correction function for detecting an angle of the projector and performing a keystone correction.

The invention achieves the above-identified object by providing a projecting device with a keystone correction function. The projecting device with the keystone correction includes an adjustable part, a signal generator, a correction circuit and a micro-processing control unit. The adjustable part is coupled to a supporting foot of the projecting device, and its electric property changes along with the variation of the height of the supporting foot. When the angle of the projecting device is adjusted, the signal generator generates and outputs a corresponding adjusting signal, which is a basis for keystone correction, according to the electric property of the adjustable part. In practice, a rheostat may be utilized to implement the adjustable part, and a biasing circuit and a converter may be utilized to implement the signal generator. When the angle is adjusted, the resistance of the rheostat is also adjusted simultaneously to make the biasing circuit output different voltages to generate the adjusting signal. Since the adjusting signal is correspondent with the angle of the projecting device, the correction circuit may perform the keystone correction on the projecting frame according to the adjusting signal so as to project a fairly upright image.

Other objects, features, and advantages of the invention will become apparent from the following detailed description of the preferred but non-limiting embodiment. The following description is made with reference to the accompanying drawings.

DETAILED DESCRIPTION OF THE INVENTION

Figure 1:
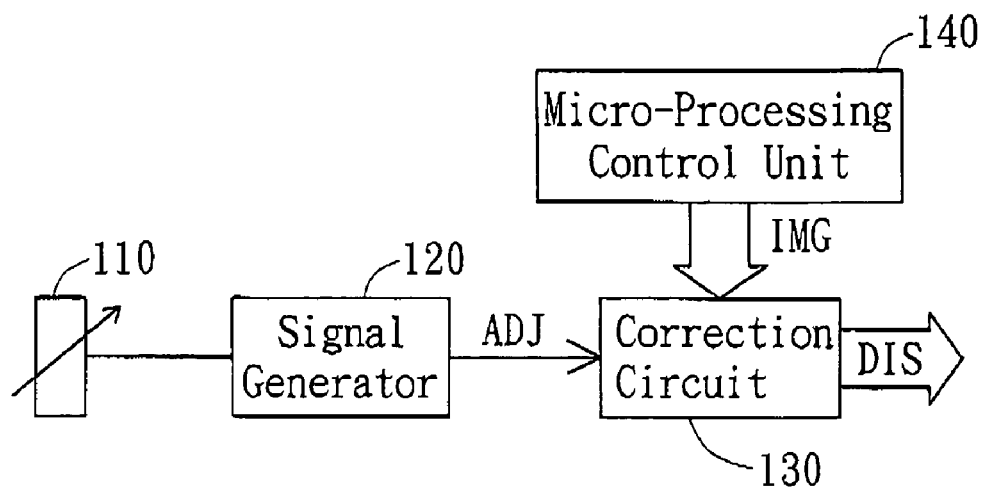
FIG. 1 is a block diagram showing a keystone correction device according to a preferred embodiment of the invention.

In general, a height-adjustable supporting foot is disposed on a bottom of a projecting device, and the height of the supporting foot is directly proportional to an angle of the projecting device. Thus, if the height of the supporting foot may be detected, the angle of the projecting device may be obtained and the keystone correction for the projecting frame may be performed. FIG. 1 is a block diagram showing a keystone correction device for correcting a to-be-projected projecting frame of the projecting device according to a preferred embodiment of the invention. Referring to FIG. 1, the keystone correction device includes an adjustable part 110, a signal generator 120, a correction circuit 130 and a micro-processing control unit (MCU) 140. The adjustable part 110 is coupled to the supporting foot of the projecting device. When the height of the supporting foot is adjusted, the electric property of the adjustable part 110 changes synchronously. At this time, the signal generator 120 may generate and output a corresponding adjusting signal ADJ, which is a basis for keystone correction, according to the electric property of the adjustable part 110. When the MCU 140 transfers the projecting frame IMG to the correction circuit 130, the correction circuit 130 may correct the projecting frame IMG according to the adjusting signal ADJ and project the corrected projecting frame DIS, which is a fairly upright image.

Figure 2:
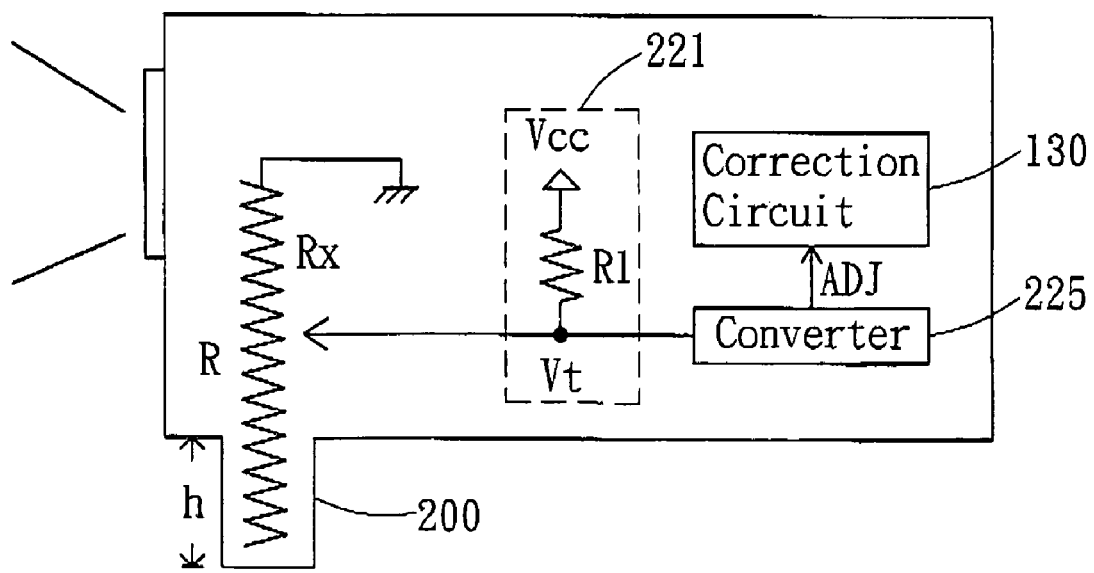
FIG. 2 is a block diagram showing a projecting device equipped with the keystone correction device of FIG. 1.

FIG. 2 is a block diagram showing a projecting device equipped with the keystone correction device of FIG. 1. The projecting device 20 is equipped with a height-adjustable supporting foot 200. In such a design, it is possible to utilize a rheostat R coupled to the supporting foot 200 to implement the adjustable part 110. In addition, a biasing circuit 221 and a converter 225 coupled to the rheostat R may be utilized to implement the signal generator 120, wherein the converter 225 may be, for example, an analog-to-digital converter (ADC). When the height of the supporting foot 200 is adjusted, the resistance Rx changes along with the variation of the height h because the rheostat R is coupled to the supporting foot 200. The voltage Vcc of the biasing circuit 221 is divided by the resistor R1 and the resistor Rx, and then a voltage Vt is output to the converter 225, which generates an adjusting signal ADJ corresponding to the voltage Vt and serving as a basis for the correction circuit 130 to perform the keystone correction. In brief, the resistance Rx is also adjusted simultaneously when the angle is adjusted, and the biasing circuit 221 may output different voltages Vt. So, different adjusting signals ADJ may be generated. Since the adjusting signal ADJ is correspondent with the angle of the projecting device 20, the correction circuit 130 may perform the keystone correction on the projecting frame according to the adjusting signal ADJ. Thus, a fairly upright image may be projected.

Figure 3:
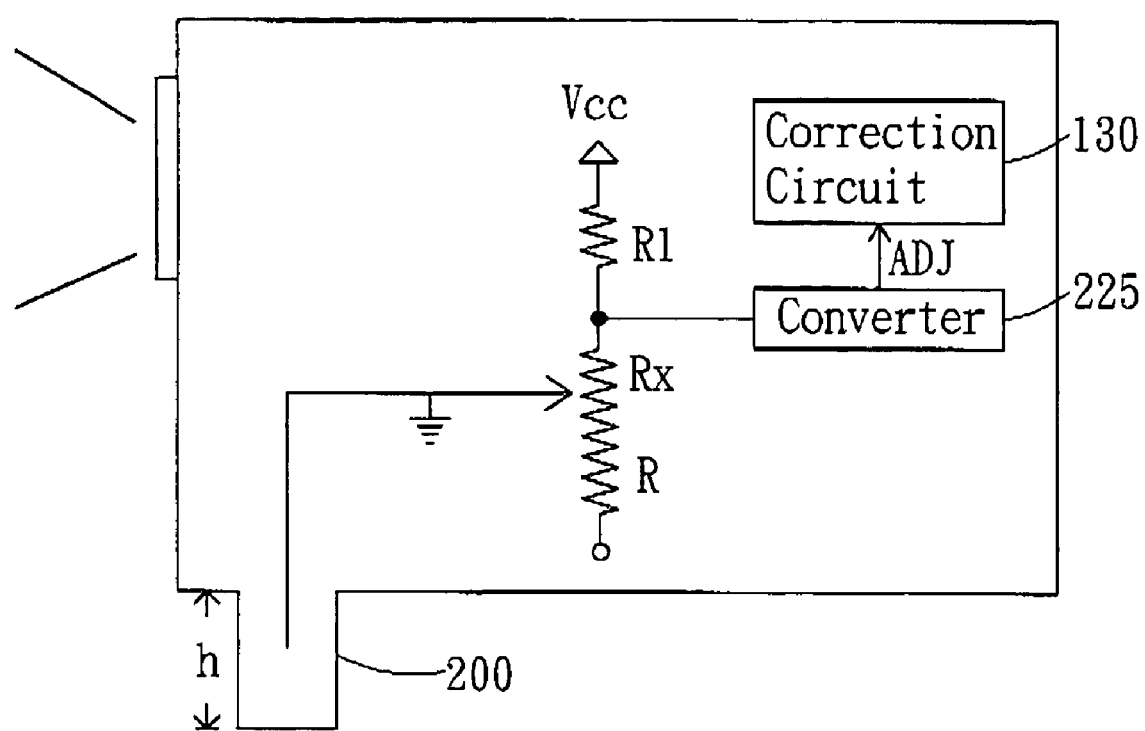
FIG. 3 is a block diagram showing another adjustable part coupled to a biasing circuit.

Of course, the adjustable part is not limited to the above-mentioned architecture. FIG. 3 is a block diagram showing another adjustable part coupled to a biasing circuit. Although the rheostat R is utilized to implement the adjustable part 110, this architecture is different from that of FIG. 2 in that the supporting foot is coupled to a ground of the rheostat R. When the height of the supporting foot is adjusted, the grounded position of the rheostat R is changed accordingly. Thus, the resistance Rx changes along with the variation of the height of the supporting foot. For example, when the supporting foot is elevated, the ground of the rheostat R is pulled down and the resistance Rx is increased accordingly. So, the voltage input to the converter 225 also increases accordingly. On the contrary, when the supporting foot is lowered, the voltage input to the converter 225 also decreases accordingly. Thus, the output voltage of the biasing circuit is directly proportional to the angle of the projector. The voltage is converted by the converter 225 and may serve as a basis for the correction circuit 130 to perform the keystone correction.

The projecting device with a keystone correction function according to the above-mentioned embodiment of the invention utilizes the adjustable part to detect the angle as a basis for the keystone correction. Compared to the prior art, the architecture of the invention is simple and may be easily implemented without using a horizontal IC. Thus, the cost may be saved and the product competitiveness may be increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projecting device with a keystone correction function for correcting a projecting frame outputting from the projecting device, the projecting device has a height-adjustable supporting foot for adjusting an angle of the projecting device, the projecting device comprising:
   an adjustable part, coupled to the supporting foot, for determining an electric property of the adjustable part according to a height of the supporting foot, the adjustable part including:
      an electric element connected to the supporting foot, and
      a terminal disposed with respect to the projecting device, wherein a position where the electric element is coupled to the terminal changes when the height of the supporting foot is adjusted, and the electric element with respect to the position determines the electric property of the adjustable part;
   a signal generator, coupled to the adjustable part, for outputting an adjusting signal according to the electric property of the adjustable part; and
   a correction circuit, coupled to the signal generator, for performing a keystone correction on the projecting frame according to the adjusting signal.

2. The projecting device according to claim 1, wherein the adjustable part is a rheostat having an adjustable resistance, the adjustable resistance determined by the height of the supporting foot.

3. The projecting device according to claim 1, wherein the signal generator comprises:
   a biasing circuit, coupled to the terminal of the adjustable part, for outputting a voltage according to the electric property of the adjustable part; and
   a converter, coupled to the biasing circuit, for converting the voltage into the adjusting signal.

4. The projecting device according to claim 3, wherein the converter is an analog-to-digital converter (ADC).

5. The projecting device according to claim 3, wherein the adjustable part is a rheostat having a resistance depending on the height of the supporting foot.

6. The projecting device according to claim 1, wherein the electric element is disposed inside the supporting foot.

7. The projecting device according to claim 6, wherein the electric element is disposed along the supporting foot.

8. A projecting device with a keystone correction function for correcting a projecting frame outputting from the projecting device, the projecting device comprising:
   a height-adjustable supporting foot for adjusting an angle of the projecting device;
   an adjustable part, coupled to the supporting foot, for determining an electric property of the adjustable part according to a height of the supporting foot, the adjustable part including:
      an electric element disposed with respect to the projecting device, and
      a terminal coupled to the supporting foot, wherein a position where the electric element is coupled to the terminal changes when the height of the supporting foot is adjusted, and the electric element with respect to the position determines the electric property of the adjustable part;
   a signal generator, coupled to the adjustable part, for outputting an adjusting signal according to the electric property of the adjustable part; and
   a correction circuit, coupled to the signal generator, for performing a keystone correction on the projecting frame according to the adjusting signal.

9. The projecting device according to claim 8, wherein the electric element and the terminal operate as a rheostat having a resistance depending on the height of the supporting foot.

10. The projecting device according to claim 9, wherein the terminal is a ground.

11. The projecting device according to claim 8, wherein the signal generator comprises:
   a biasing circuit, coupled to the electric element, for outputting a voltage according to the electric property of the adjustable part; and
   a converter, coupled to the biasing circuit, for converting the voltage into the adjusting signal.

12. The projecting device according to claim 11, wherein the converter is an analog-to-digital converter (ADC).

13. The projecting device according to claim 11, wherein the electric element and the terminal operate as a rheostat having a resistance depending on the height of the supporting foot.

14. The projecting device according to claim 13, wherein the terminal is a ground.

* * * * *